United States Patent [19]
Moss, deceased et al.

[11] 3,905,225

[45] Sept. 16, 1975

[54] VEHICLE TESTING APPARATUS AND METHOD

[76] Inventors: Romeyn K. Moss, deceased, late of Lexington, N.C., by Rachel Tomlinson Moss, executrix, 101 Eastside Dr., Lexington, N.C. 27292

[22] Filed: Feb. 20, 1974

[21] Appl. No.: 443,956

[52] U.S. Cl. ................................. 73/117; 73/114
[51] Int. Cl.² ...................................... G01L 5/13
[58] Field of Search ........................... 73/117, 114

[56] References Cited
UNITED STATES PATENTS

| | | | |
|---|---|---|---|
| 2,521,322 | 9/1950 | Baadte | 73/114 |
| 3,680,368 | 8/1972 | Warsaw | 73/117 |
| 3,683,684 | 8/1972 | Jadlowe | 73/114 X |

*Primary Examiner*—Jerry W. Myracle
*Attorney, Agent, or Firm*—Parrott, Bell, Seltzer, Park & Gibson

[57] ABSTRACT

Automotive vehicles such as trucks are subjected to tests by a method and through the use of a dynamometer apparatus which facilitates a more consistently accurate determination of the wheel horsepower of the vehicle under test and an evaluation of the economics of operation of the vehicle.

18 Claims, 3 Drawing Figures

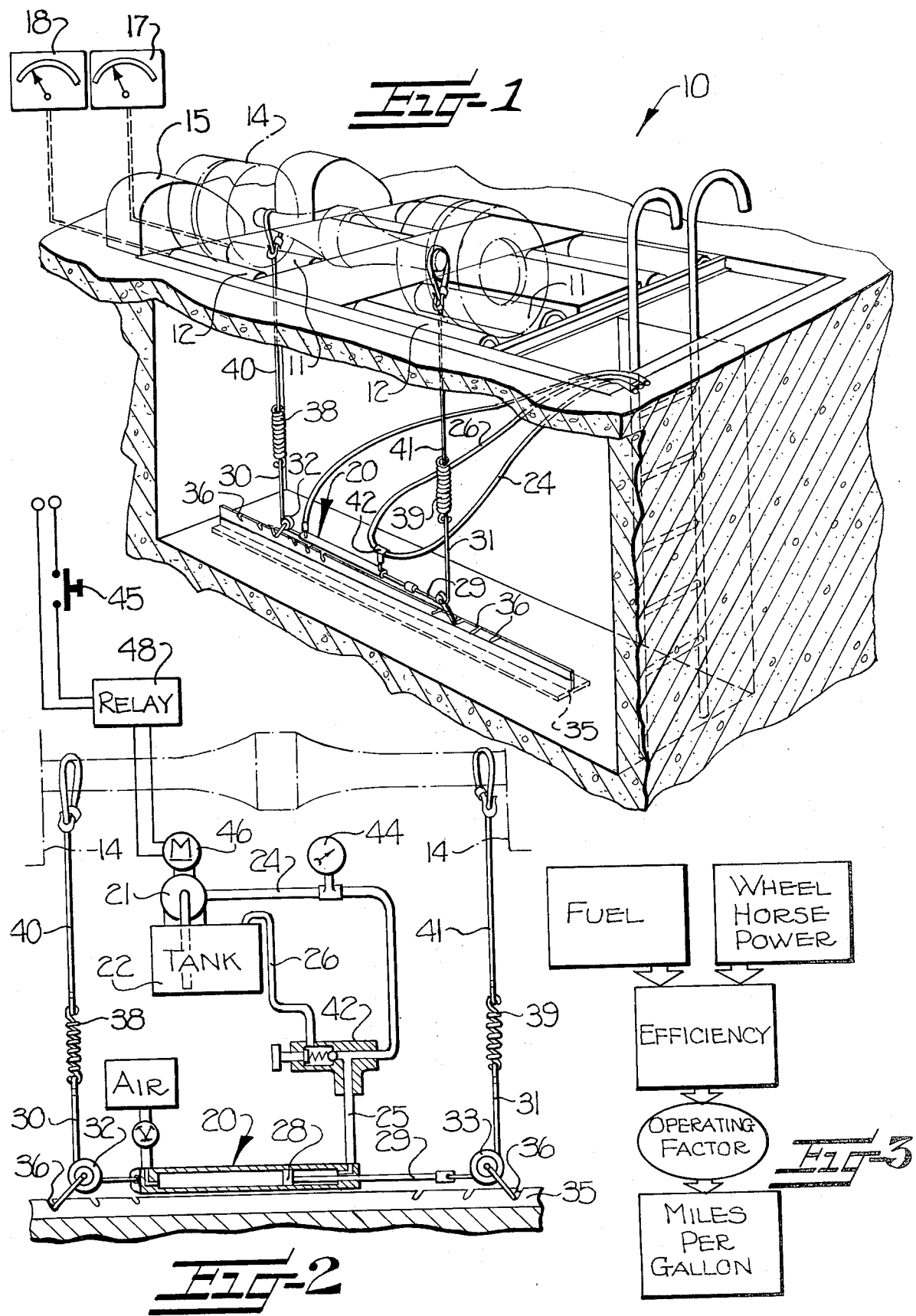

VEHICLE TESTING APPARATUS AND METHOD

Testing of automotive vehicles and the motive power means which drives such vehicles has for many years been accomplished, at least in part, through the use of dynamometers. Particularly with the class known as chassis dynamometers, efforts have been made to evaluate the operation of an automotive vehicle under conditions simulating conditions of actual use on the road or highway. Such analysis, as heretofore carried out, has proved of value to users of automotive vehicles and of particular value to commercial users such as trucking companies and the like. Due to the advantages gained from testing of vehicles with chassis dynamometers, such testing installations have come into wider use and the testing procedures followed have been increasingly developed.

In such development of chassis dynamometers and testing methods using such dynamometers, certain deficiencies have been identified. In particular, the determination of the wheel horsepower delivered by a vehicle under test has not been consistently repeatable, in that a range of variable conditions have influenced such determination. In specific example, the application of a dynamometer brake to test the vehicle under part load or full load brings about creep or slippage of vehicle tires relative to the load roll of the dynamometer. Such slippage brings about undue wear on the vehicle tires, increased heat due to friction, tire damage and may in extreme cases prevent the testing of the vehicle.

Such slippage is due primarily to the relationship between the weight of the vehicle under test and the pressure applied by the vehicle wheels on the load roll and idle roll of the dynamometer to the torque developed by the vehicle when tested under load. Heretofore, efforts at controlling such slippage have involved placing additional weight in the vehicle under test. By such weighting, the rolling resistance of the tires is changed, and the wheel horsepower determination is affected. While such weighting of the vehicle aids in controlling slippage, the testing conditions which result are not such as to be repeatable. Thus, the conditions of tests and the basis upon which wheel horsepower is determined inevitably vary even for successive tests on the same automotive vehicle.

It is an object of the present invention to facilitate a more consistently accurate determination of the wheel horsepower of a vehicle under test on a chassis dynamometer. Such a more accurate determination will be recognized, from an appreciation of the present invention, as significantly enhancing the usefulness of a chassis dynamometer in analysis of the operating characteristics and the like of an automotive vehicle. In accomplishing this object of the present invention, wheel slippage while testing under load is standardized, thereby providing a standardized condition for determination of wheel horsepower and permitting successively conducted tests to be more accurately compared.

A further object of the present invention is to evaluate the economics of operation of an automotive vehicle under test on a chassis dynamometer by indicating during the course of the vehicle test certain characteristic economic factors affecting the operation of the vehicle over the road. In realizing this object of the present invention, signals are generated indicative of certain basic test information and these signals are then operated upon in such a manner as to generate combined and modified signals representative of the economic factors. By application of such economic factors, the economic benefit or detriment realized by modifications of the vehicle under test may be evaluated.

Some of the objects and advantages of the invention having been stated, others will appear as the description proceeds, when taken in connection with the accompanying drawings, in which:

FIG. 1 is a perspective view of a chassis dynamometer installation incorporating the present invention;

FIG. 2 is a schematic elevation view of certain components in the installation of FIG. 1; and FIG. 3 is a diagrammatic representation of certain testing operations performed by the installation of FIGS. 1 and 2.

The detailed disclosure which will now follow will refer particularly to the accompanying drawing. At the outset, however, it is to be understood that the present invention is of broad utility and neither the drawing nor the description which follows hereinafter are to be taken as limiting the scope of the present invention which is envisioned as having general utility in the application of chassis dynamometers.

As is known to persons skilled in the use of chassis dynamometers, such a dynamometer installation, generally indicated at 10 in FIG. 1, typically includes a load roll 11 and an idle roll 12 for together receiving and rotatably supporting the driving wheels 14 of a vehicle under test (not shown). Many installations, such as the installation 10 in FIG. 1, are provided with multiple sets of load rolls 11 and idle rolls 12, for receiving multiple axles of an automotive vehicle to be tested. As is known to persons skilled in the construction and use of chassis dynamometers such as the dynamometer installation 10, brake means are provided for imposing a rotational load on the load roll 11 to permit testing of the wheel horsepower delivered by the driving wheels 14 under simulated highway conditions. A portion of such a brake means is represented in FIG. 1 by the brake means housing 15. The dynamometer installation 10 includes such other components and elements (not shown) as are conventional and known to persons skilled in the construction and use of a chassis dynamometer.

In accordance with an important feature of the present invention, means are operatively connected with the load roll 11 and the idle roll 12 for sensing rotation thereof and for indicating differences in the rates of rotation so as to thereby indicate any slippage occurring between the vehicle driving wheels 14 and the load roll 11. In the form illustrated, the slip comparison means comprises first tachometer means operatively connected with the load roll 11 for generating a first speed signal indicative of the rotational speed of the load roll and second tachometer means operatively connected with the idle roll 12 for generating a second speed signal indicative of the rotational speed of the idle roll. Connected with the first and second tachometers are indicating means for receiving the first and second speed signals and for displaying any difference therebetween. Preferably, the indicating means comprises first and second display means 17, 18 each operatively connected with a corresponding one of the first and second tachometers for indicating in units of velocity (such as miles per hour) the rotational speed of the corresponding one of the load and idle rolls 11, 12. The speed indicators 17, 18 preferably are mounted on an operator's panel or console which is conventionally provided in the chassis dynamometer installation, as known to persons skilled in the construction and operation of such installations. By mounting the indicators 17, 18 in such a console, an operator using the chassis dynamometer 10 to test a vehicle may directly view the indicated rotational speeds of the load and idle roll 11, 12. Upon occurrence of slippage between the driving wheels 14 and the load roll 11, the velocity displayed by the first indicator 17 will drop below the velocity displayed by the second indicator 18, as slippage does not occur between the driving wheels 14 and the idle roll 12.

In order to facilitate a more consistently accurate determination of the wheel horsepower of a vehicle under test, the present invention provides slip control means for imposing on the vehicle driving wheel 14 a controllably variable loading force acting to control slippage between the vehicle driving wheels 14 and the load roll 11. This force imposing means is operated upon an indicated difference in the rates of rotation of the load roll and idle roll 11, 12 for maintaining a desired relationship therebetween. In the embodiment illustrated, the present invention provides a pressure fluid actuated cylinder 20 functioning as a motive means for exerting a force. Through the provision of a pump 21 communicating with a storage tank or reservoir 22 and with appropriate flow conduits 24, 25, 26, actuating liquid such as hydraulic fluid is delivered under pressure to the cylinder 20 and thereby controls the exertion of force by the cylinder. Through delivery of hydraulic fluid through a conduit 25 communicating with the cylinder 20, fluid acts against a piston 28 within the cylinder 20 to draw a piston rod 29 into the cylinder 20.

The force thus generated is transmitted from the cylinder 20 to the vehicle under test through a linkage arrangement including first and second cables 30, 31. The cables 20, 31 are operatively connected with the driving axle through which power is transmitted to the driving wheels 14 and, due to the positioning of the cylinder 20 in a pit underlying the dynamometer rolls 11, 12, transmit to the drive axle and the wheel 14 a force which pulls the wheels into more consistently maintained engagement with the load roll 11. In particular, the cables 30, 31 pass through mounting sheaves or pulleys 32, 33. Each of the sheaves or pulleys is also connected to a base member 35 which extends beneath the dynamometer rolls 11, 12 in a position substantially aligned with the position assumed by the drive axle of the vehicle under test. By the provision of a plurality of notches 36 in the base member 35, the spacing of the sheaves 32, 33 one from the other may be determined to accommodate varying sizes of vehicles to be tested. Due to the floating position of the cylinder 20, which is not directly attached to any supporting structure, the cylinder 20 and piston rod 29 are free to assume such positions as may be required in imposing the controllably variable loading force on the vehicle with driving wheels 14.

In order to avoid damage to the vehicle under test which might otherwise possibly occur through application of the slip control means of the present invention, two preventive steps are followed. First, springs 38, 39 are interposed between the cables 30, 31 connected with the cylinder 20 and piston rod 29 and axle cables 40, 41 which are brought into engagement with the vehicle drive axle. These springs accommodate shocks and irregularities in tires which might otherwise cause damage if the system were completely rigid. Secondly, a manually adjustable overload valve 42 is interposed between the delivery conduit 25 and the pump 21, and to permit a manually adjusted maximum pressure to be imposed on the cylinder 20 and thereby establish a maximum or upper limit for force which can be exerted on the drive axle of the vehicle under test.

It is to be noted that the pressure at which actuating fluid is delivered to the cylinder 20 is indicated by an appropriate gauge 44, which suitably is mounted on the operator's console or panel near the indicator 17, 18 of the slip comparison means. Further, delivery of pressurizing fluid by the pump 21 is controlled by a manually operated device, preferably an electrical switch 45 operating an electrical drive motor 46 for the pump 21 through means of a relay 48. The manually operable control device, disclosed as the switch 45, preferably is placed in an operator's remote control, to be availble for manipulation by the operator during testing of a vehicle received by the chassis dynamometer 10.

In accordance with the present invention, it is contemplated that a vehicle position on the dynamometer 10 for tests may have operatively connected thereto a means which is responsive to the flow of fuel to the vehicle engine for generating a signal indicative of fuel consumption per unit of time during tests of the vehicle. Such fuel flow rate detectors are generally known to persons skilled in the art of constructing and using instruments for laboratory testing of internal combustion engines and, for that reason, will not be disclosed in detail here. Such a fuel consumption signal is combined, in accordance with the present invention, with other signals in order to achieve certain novel and important objects of the present invention.

More particularly, it is conventional for a chassis dynamometer to include means for generating a signal indicative of the wheel horsepower delivered by the driving wheels of a vehicle under test. In accordance with the teaching of this invention, a signal indicative of fuel consumption per unit of time during test of a vehicle and a signal indicative of the wheel horsepower delivered by the driving wheels of the vehicle under tests are delivered to a signal divider means as diagrammatically represented in FIG. 3. Referring particularly to an automotive vehicle powered by a diesel internal combustion engine, the efficiency of the vehicle is determined by the quantity of fuel (in pounds per hour) consumed under load divided into the useable wheel horsepower delivered to the surface of the road. For example, if wheel horsepower delivered was 144 and the consumption of fuel was 72 pounds per hour, the resulting efficiency would be 2. In accordance with the present invention, the wheel horsepower signal and the fuel consumption signal are used in generating a ratio signal indicative of the efficiency of a vehicle under test, in the manner briefly outlined hereinabove.

In accomplishing this step, reliance is placed upon analog computation electrical circuit means in receiving and producing analog signals. Such analog computation electrical circuits are generally known to persons skilled in and familiar with electrical and electronic instrumentation and, for that reason, will not be described in detail here. For purposes of the present disclosure, it will suffice to state that a person skilled in the art may select an appropriate analog computation circuit based upon the disclosure herein of the manner in which various signals are generated and delivered and the classes of computation to be performed.

In accordance with the present invention, the ratio signal representative of the efficiency of the vehicle under test is delivered to a signal multiplier means which modifies the ratio signal by an operating factor for the vehicle under test. More particularly, the efficiency stated in terms of wheel horsepower per pound of fuel per hour will yield the fuel mileage of the vehicle under test when multiplied by an operating factor. In an instance where the fuel mileage of an automotive vehicle has been determined by experience, through record keeping during use of the vehicle, the operating factor may be determined by dividing the fuel mileage by the efficiency ratio for the vehicle. Conversely, the efficiency ratio for the vehicle may be multiplied by the operating factor in order to determine fuel mileage.

This relationship is used, in the present invention, both to project the fuel mileage for the vehicle under test and to determine the operating factor, depending upon the given particular circumstances. That is, where the fuel mileage for the vehicle is known by experience, the signal multiplier means is manually adjusted to modify the efficiency ratio signal in such a manner as to produce a modified ratio signal comparable to the known fuel mileage of the vehicle under test. Where the operating factor has been earlier determined by testing of the vehicle, the projected fuel mileage may be obtained by presetting the signal multiplier means to the known operating factor and then displaying the magnitude of the resultant modified ratio signal. Consistent with these approaches, it is desirable that the signal multiplier means include a manually adjustable element such as a variable potentiometer calibrated in units of operating factor. Further, it is preferred that the modified efficiency ratio signal generated by the signal multiplier means be delivered to a display means such as electrical meter calibrated in units of fuel mileage.

In an installation in accordance with the present invention, the effectiveness of repair of modification of a vehicle may be evaluated by placing the vehicle on the dynamometer before any change is made and running the vehicle through a test sequence. By such test sequence, the modification of the efficiency ratio signal is adjusted to display a fuel mileage equal to that known from experience, at the same time that the slip control loading force is recorded. The desired modification (which may be a repair or a development modification) is then undertaken and the vehicle returned to the dynamometer for evaluation. In the evaluation test sequence, the slip control means is adjusted to impose the same slip control loading force on the vehicle drive wheels or to obtain the identical conditions of slippage. Then, with the signal multiplier means adjusted to the previously determined operating factor, any change in fuel mileage obtained from the vehicle is directly displayed.

In the drawings and specification, there has been set forth a preferred embodiment of the invention, and although specific terms are employed, they are used in a generic and descriptive sense only and not for purposes of limitation.

That which is claimed is:

1. In a chassis dynamometer having a load roll and an idle roll for together receiving and rotatably supporting the driving wheels of a vehicle under test and having brake means for imposing a rotational load on the load roll, the combination therewith of means for facilitating a more consistently accurate determination of the wheel horsepower of vehicles under test and comprising:

slip comparison means operatively connected with said load roll and with said idle roll for sensing rotation thereof and for indicating differences in the rates of rotation thereof and thereby indicating any slippage occurring between the vehicle driving wheels and said load roll, and slip control means for imposing on the vehicle driving wheels a controllably variable loading force acting to control slippage between the vehicle driving wheels and said load roll, said force imposing means being operable upon an indicated difference in the rates of rotation of said load roll and said idle roll for maintaining a desired relationship therebetween, whereby dynamometer determinations of wheel horsepower are made under repeatable conditions of slippage between the vehicle driving wheels and said load roll.

2. The combination according to claim 1 wherein said slip comparison means comprises first tachometer means operatively connected with one of said load roll and said idle roll for generating a first speed signal indicative of the rotational speed of said one roll, second tachometer means operatively connected with the other of said load roll and said idle roll for generating a second speed signal indicative of the rotational speed of said other roll, and indicating means operatively connected with said first and second tachometer means for receiving said first and second speed signals and for displaying any difference therebetween.

3. The combination according to claim 2 wherein said indicating means comprises first and second display means each operatively connected with a corresponding one of said tachometer means for indicating in units of velocity the rotational speed of the corresponding one of said rolls.

4. The combination according to claim 1 wherein said slip control means comprises pressure fluid actuated motive means for exerting a force, fluid supply means operatively connected with said motive means for supplying pressure fluid thereto and thereby for controlling the exertion of force by said motive means, and linkage means for operatively connecting said motive means to a vehicle under test.

5. The combination according to claim 4 wherein said fluid supply means comprises reservoir means for retaining a quantity of actuating liquid, pump means for circulating actuating liquid between said reservoir means and said motive means, and manually operable control means operatively connected with said pump means for controlling circulation of actuating fluid thereby and thereby for controlling the loading force transmitted to the vehicle under test through said linkage means.

6. In a chassis dynamometer having means for generating a signal indicative of the wheel horsepower delivered by the driving wheels of a vehicle under test, the combination therewith of means for evaluating the economics of operation of the vehicle and comprising:

means operatively connected to the vehicle under test and responsive to flow of fuel for generating a signal indicative of fuel consumption per unit of time during test of the vehicle, signal divider means operatively connected for receiving said wheel horsepower signal and said fuel consumption signal and for generating a ratio signal indicative of the efficiency of the vehicle under test, signal multiplier means operatively connected to said signal divider means for receiving said ratio signal and for modifying said ratio signal by an operating factor for the vehicle under test, and display means operatively connected to said signal multiplier means for receiving said modified ratio signal and for displaying the magnitude thereof as the fuel mileage of the vehicle under test.

7. The combination according to claim 6 further comprising fuel source means for supplying fuel to a vehicle under test and wherein said fuel comsumption signaling means comprises flow rate sensing means operatively interposed between said fuel source means and the fuel consuming engine of the vehicle under test for detecting and signaling the fuel flow rate.

8. The combination according to claim 6 wherein said wheel horsepower and fuel consumption signals are electrical analog signals and said signal divider means and said signal multiplier means each comprise corresponding analog computation electrical circuit means for cooperating in producing an analog output signal as said modified ratio signal.

9. The combination according to claim 6 wherein said signal multiplier means is manually adjustable for alternatively determining a previously unknown fuel mileage from a previously known operating factor and determining a previously unknown operating factor from a previously known fuel mileage.

10. The combination according to claim 6 wherein a more consistently accurate determination of the wheel horsepower of vehicles under test is facilitated and further comprising:

slip comparison means operatively connected with a load roll and with an idle roll of said chassis dynamometer for sensing rotation thereof and for indicating differences in the rates of rotation thereof and thereby indicating any slippage occurring between the vehicle driving wheels and said load roll, and slip control means for imposing on the vehicle driving wheels a controllably variable loading force acting to control slippage between the vehicle driving wheels and said load roll, said force imposing means being operable upon an indicated difference in the rates of rotation of said load roll and said idle roll for maintaining a desired relationship therebetween.

11. A method of more repeatably determining the wheel horsepower delivered by the driving wheels of a vehicle under test on a chassis dynamometer comprising the steps of supporting the driving wheels on a load roll and an idle roll while imposing on the load roll a rotational load resisting rotation of the driving wheels, sensing the rotation of the load roll and the idle roll while indicating differences in the rates of rotation thereof and thereby indicating any slippage occurring between the driving wheels and the load roll, and imposing on the driving wheels a controllably variable loading force acting to control slippage between the driving wheels and the load roll while varying the slip controlling force to maintain a desired relationship between the rates of rotation of the load roll and the idle roll.

12. A method according to claim 11 wherein the sensing of roll rotation and indicating of slippage comprise generating a first speed signal indicative of the rotational speed of one of the load roll and the idle roll, generating a second speed signal indicative of the rotational speed of the other of the load roll and the idle roll, and displaying any difference between the speed signals.

13. A method according to claim 12 wherein the displaying of speed signal differences comprises indicating in units of velocity the rotational speeds of the load and idle rolls.

14. A method according to claim 11 wherein the imposing of a loading force comprises supplying actuating pressure fluid to an operating cylinder, generating with the cylinder a force, and transmitting the force to the driving wheels.

15. A method according to claim 14 wherein the supplying of actuating pressure fluid comprises manually controlling circulation of an actuating liquid to the cylinder and thereby establishing the magnitude of the force transmitted to the driving wheels.

16. A method of projecting the fuel mileage obtained from a vehicle comprising the steps of:

supporting the driving wheels of the vehicle on a load roll and an idle roll of a chassis dynamometer, generating with the dynamometer a signal indicative of the wheel horsepower delivered by the driving wheels while generating a signal indicative of the fuel consumption of the vehicle per unit of time during test, generating from the wheel horsepower indicative and the fuel consumption signal a ratio signal indicative of the efficiency of the vehicle, modifying the efficiency ratio signal by a predetermined operating factor, and displaying the modified efficiency ratio signal as indicative of the fuel mileage of the vehicle.

17. A method according to claim 16 further comprising the steps of:

sensing the rotation of the load roll and the idle roll while indicating differences in the rates of rotation thereof and thereby indicating any slippage occurring between the driving wheels and the load roll, and imposing on the driving wheels a controllably variable loading force acting to control slippage between the driving wheels and the load roll while varying the slip controlling force to maintain a desired relationship between the rates of rotation of the load roll and the idle roll.

18. A method of evaluating the effectiveness of modification of a vehicle comprising the steps of:

determining fuel mileage and an operating factor for the vehicle prior to modification and, subsequent to modification, supporting the driving wheels of the modified vehicle on a load roll and an idle roll of a chassis dynamometer, generating with the dynamometer, a signal indicative of the wheel horsepower delivered by the driving wheels while generating a signal indicative of the fuel consumption of the modified vehicle per unit of time during test, generating from the wheel horsepower signal and the fuel consumption signal a ratio signal indicative of the efficiency of the modified vehicle, modifying the efficiency ratio signal by the previously determined operating factor for the vehicle, and displaying the modified efficiency ratio signal as indicative of the fuel mileage of the vehicle, whereby comparison of the fuel mileage for the vehicle before and after modification facilitates an evaluation of the benefit resulting from the modification.

* * * * *

UNITED STATES PATENT OFFICE
CERTIFICATE OF CORRECTION

PATENT NO. : 3,905,225
DATED : September 16, 1975
INVENTOR(S) : Romeyn K. Moss

It is certified that error appears in the above-identified patent and that said Letters Patent are hereby corrected as shown below:

Column 3, Line 16, "wheel" should be --wheels--;

Column 4, Line 18, "availble" should be --available--;

Column 8, Line 29, after "horsepower" insert --signal--;

Column 8, Line 29, delete "indicative".

Signed and Sealed this third Day of February 1976

[SEAL]

Attest:

RUTH C. MASON
Attesting Officer

C. MARSHALL DANN
Commissioner of Patents and Trademarks